United States Patent [19]
Kobayashi et al.

[11] Patent Number: 5,522,912
[45] Date of Patent: Jun. 4, 1996

[54] APPARATUS FOR MANUFACTURING THREE-DIMENSIONALLY CURVED SHEET GLASS

[75] Inventors: Makoto Kobayashi; Seiichiro Honjo; Norihiro Fujioka, all of Osaka, Japan

[73] Assignee: Nippon Sheet Glass Co., Ltd., Japan

[21] Appl. No.: 312,302

[22] Filed: Sep. 26, 1994

[30] Foreign Application Priority Data

Sep. 24, 1993 [JP] Japan .................................. 5-237748

[51] Int. Cl.⁶ .................................................. C03B 18/00
[52] U.S. Cl. ............................ 65/182.2; 65/25.4; 65/273; 65/287
[58] Field of Search ................................ 65/25.4, 182.2, 65/273, 287, 288, 289, 290, 291

[56] References Cited

U.S. PATENT DOCUMENTS

| | | | |
|---|---|---|---|
| 3,293,015 | 12/1966 | Fredley et al. | 65/182.2 X |
| 3,332,760 | 7/1967 | McMaster et al. | 65/182.2 X |
| 3,375,093 | 3/1968 | Reising | 65/182.2 X |
| 3,375,094 | 3/1968 | McMaster et al. | 65/182.2 X |
| 3,409,422 | 11/1968 | Gulotta | 65/182.2 X |
| 3,526,491 | 9/1970 | Sharrock | 65/182.2 |

FOREIGN PATENT DOCUMENTS 52-78226  7/1977  Japan .

OTHER PUBLICATIONS

"Glass Handbook", p. 941, ed. Sumio Sakuhana et al., pub. Asakura Shoten.

Primary Examiner—David L. Lacey
Assistant Examiner—Sean Vincent
Attorney, Agent, or Firm—Merchant, Gould, Smith, Edell, Welter & Schmidt

[57] ABSTRACT

A heating furnace for heating a sheet of glass therein houses an array of beds for transferring the sheet of glass successively over the beds in the furnace in a first direction toward an outlet opening of the heating furnace while shaping the sheet of glass complementarily to an upper surface of the beds. Each of the beds has a plurality of hot air ejection holes for ejecting hot air to keep the sheet of glass out of contact with the beds. The beds include a final bed disposed near the outlet opening and inclined upwardly toward the outlet opening. The final bed has an upper panel which is upwardly convex in both the first direction and a second direction transverse to the first direction.

16 Claims, 7 Drawing Sheets

APPARATUS FOR MANUFACTURING THREE-DIMENSIONALLY CURVED SHEET GLASS

BACKGROUND OF THE INVENTION

1. Field of the Invention

The present invention relates to an apparatus for manufacturing a curved sheet of glass, such as a three-dimensionally curved sheet of glass which is curved in both transverse and longitudinal directions, such as a front windshield for use on an automobile.

2. Description of the Prior Art

To manufacture a three-dimensionally curved sheet of glass which is curved in both transverse and longitudinal directions, it has been customary to use upper and lower molds (ring molds) for pressing a glass sheet therebetween to a desired shape.

However, an apparatus for pressing a glass sheet with upper and lower molds therebetween is complex in structure, and a three-dimensionally curved sheet of glass produced by such an apparatus is relatively expensive.

Another process of manufacturing a three-dimensionally curved sheet of glass is disclosed in Japanese laid-open patent publication No. 52-78226.

One known apparatus capable of successively producing three-dimensionally curved sheets of glass efficiently at a low cost employs an array of beds as disclosed in "Glass Handbook", page 491, edited by Sumio Sakuhana, et al. and published on Sep. 30, 1975 by Asakura Shoten.

Specifically, the known apparatus has a plurality of beds, each having a number of hot air ejection holes defined in an upper panel thereof. The beds are arranged successively horizontally within a heating furnace. A glass sheet is floatingly fed successively over the beds through the heating furnace. While the glass sheet is being fed in the heating furnace, it is heated and bent to the shapes of the upper surfaces of the beds.

For bending a glass sheet in a direction normal to the direction in which it is fed through the heating furnace, the upper surface of each bed may be shaped such that it is higher at its central region and lower at lateral sides thereof. However, forming a three-dimensionally curved sheet of glass for use as an automobile front windshield requires that the upper surface of each bed be curved in the direction of feed as well as in the direction normal thereto.

If the upper surface of each bed were curved in the direction of feed, then abrupt steps or surface interruptions would be created at the joints between the beds, and this would obstruct smooth feeding of glass sheets over the beds.

SUMMARY OF THE INVENTION

It is therefore an object of the present invention to provide an apparatus for manufacturing a three-dimensionally curved sheet of glass while the sheet of glass is being continuously fed over a succession of beds.

According to the present invention, there is provided an apparatus for manufacturing a curved sheet of glass, comprising a heating furnace for heating a sheet of glass therein, the heating furnace having an outlet opening, and an array of beds housed in the furnace for transferring the sheet of glass successively over the beds in the furnace in a first direction toward the outlet opening while shaping the sheet of glass complementarily to an upper surface of the beds, each of the beds having a plurality of hot air ejection holes for ejecting hot air to keep the sheet of glass out of contact with the beds, the beds including a final bed disposed near the outlet opening and inclined upwardly toward the outlet opening, the final bed having an upper panel including at least a portion curved in the direction near the outlet opening.

The portion of the upper panel may be upwardly convex in the first direction, or upwardly convex in a second direction transverse to the first direction, or upwardly convex in both the first direction and a second direction transverse to the first direction.

The apparatus may further comprise a quenching bed disposed outside of the heating furnace adjacent to the outlet opening, for receiving and quenching the sheet of glass discharged out of the outlet opening. The quenching bed may be inclined downwardly away from the outlet opening, or lie horizontally. The quenching bed may have an upper panel including an upwardly convex portion near the outlet opening.

According to the present invention, there is also provided an apparatus for manufacturing a curved sheet of glass, comprising a heating furnace for heating a sheet of glass therein, the heating furnace having an outlet opening, and an array of beds housed in the furnace for transferring the sheet of glass successively over the beds in the furnace in a first direction toward the outlet opening while shaping the sheet of glass complementarily to an upper surface of the beds, each of said beds having a plurality of hot air ejection holes for ejecting hot air to keep the sheet of glass out of contact with the beds, the beds including a final bed disposed near the outlet opening and inclined upwardly toward the outlet opening, the final bed comprising a plurality of bed units separate in the first direction and inclined such that upper panels thereof jointly provide an upwardly convex surface extending in the first direction.

The beds may include a bed disposed adjacent to the final bed and inclined upwardly toward the final bed. The apparatus may further comprise a quenching bed disposed outside of the heating furnace adjacent to the outlet opening, for receiving and quenching the sheet of glass discharged out of the outlet opening, and the quenching bed may be inclined downwardly away from the outlet opening.

According to the present invention, there is further provided an apparatus for manufacturing a curved sheet of glass, comprising a heating furnace for heating a sheet of glass therein, the heating furnace having an outlet opening, and an array of beds housed in the furnace for transferring the sheet of glass successively over the beds in the furnace in a first direction toward the outlet opening while shaping the sheet of glass complementarily to an upper surface of the beds, each of beds having a plurality of hot air ejection holes for ejecting hot air to keep the sheet of glass out of contact with the beds, the beds including a final bed disposed near the outlet opening and inclined upwardly toward the outlet opening, the final bed having an upper panel which is upwardly convex in a second direction transverse to the first direction.

The apparatus may further comprise a quenching bed disposed outside of the heating furnace adjacent to the outlet opening, for receiving and quenching the sheet of glass discharged out of the outlet opening, and the quenching bed may lie horizontally. The final bed may have an upper beveled edge on a downstream end thereof to keep the downstream end out of contact with the sheet of glass when the sheet of glass is discharged out of the outlet opening.

The sheet of glass is heated in the heating furnace and transferred successively over the beds while being floated off the beds by hot air ejected from the hot air ejection holes. The sheet of glass is transferred to the final bed and curved to the curved shape of the upper panel of the final bed. The curved sheet of glass is smoothly discharged out of the outlet opening and transferred onto the quenching bed.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
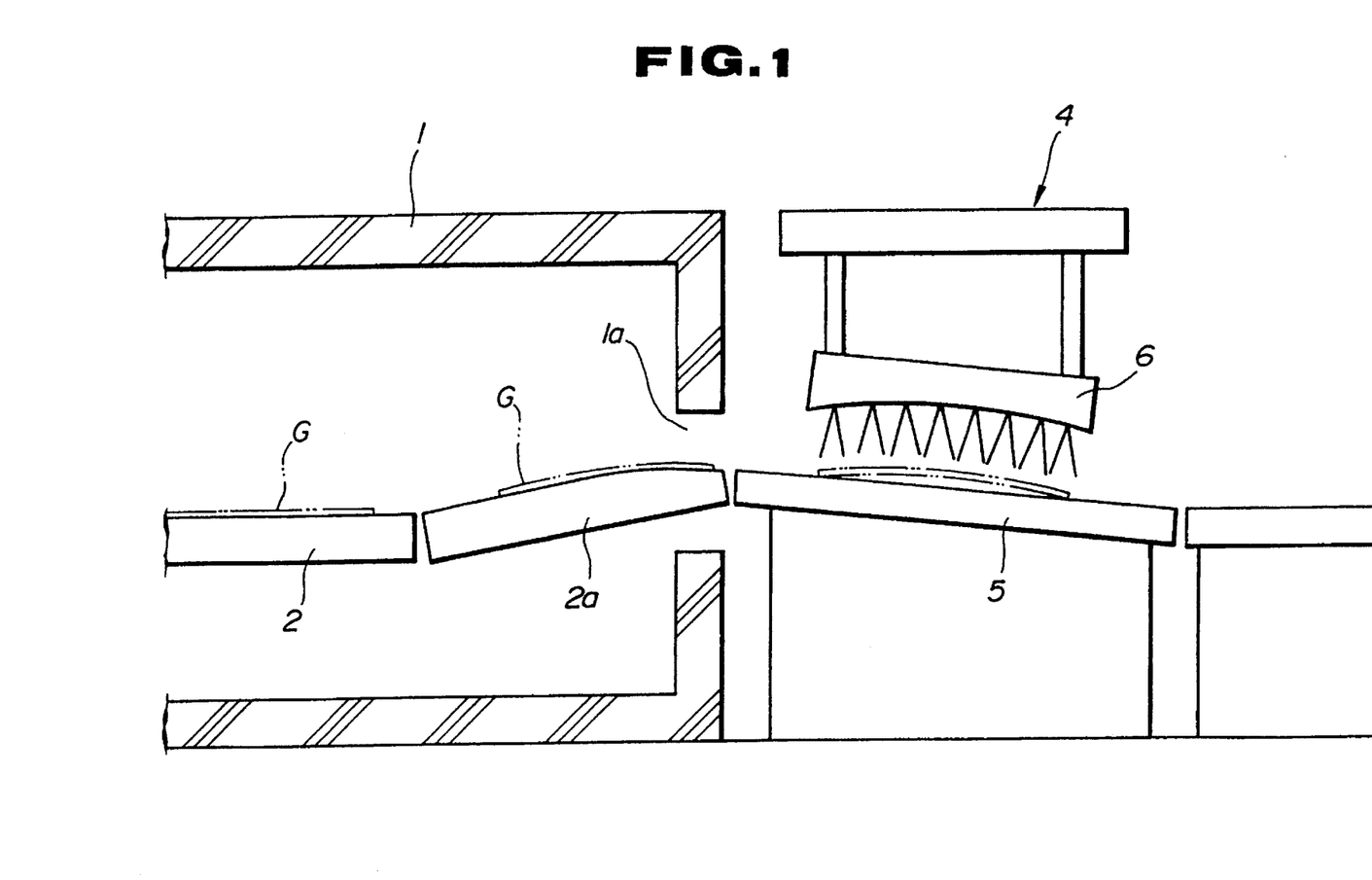
FIG. 1 is a longitudinal cross-sectional view of an apparatus for manufacturing a three-dimensionally curved sheet of glass according to an embodiment of the present invention.
Figure 2:
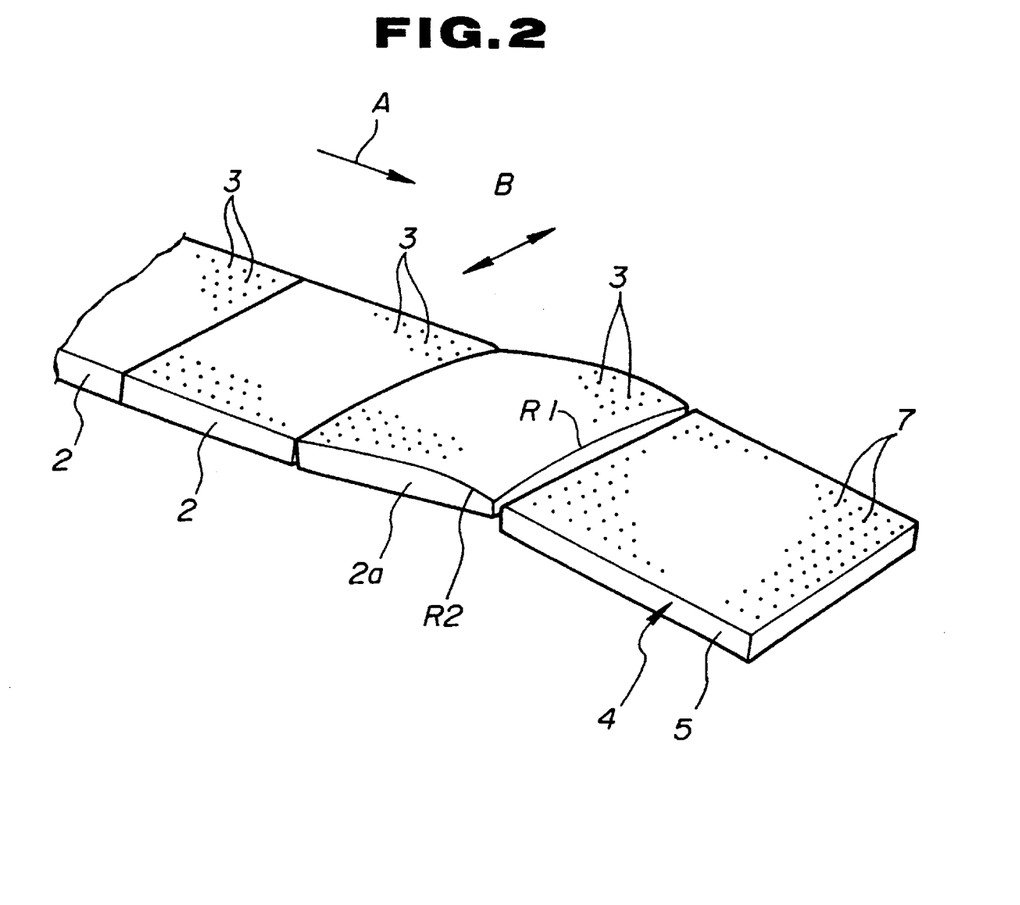
FIG. 2 is a fragmentary perspective view of a succession of beds of the apparatus.

As shown in FIG. 1, an apparatus for manufacturing a three-dimensionally curved sheet of glass according to an embodiment of the present invention has a tunnel-shaped heating furnace 1 housing a linear array of beds 2 for transferring a sheet G of glass successively thereover in the heating furnace 1 in the direction indicated by the arrow A. Each of the beds 2 has a plurality of hot air ejection holes 3 (see FIG. 2) defined in an upper panel thereof.

The beds 2 include a final bed 2a positioned near and having an end entering an outlet opening 1a defined in a rear vertical wall 1b of the heating furnace 1. The final bed 2a is inclined upwardly toward the outlet opening 1a, i.e., it is inclined with respect to the horizontal plane such that its upper perforated panel is progressively higher toward the outlet opening 1a. The upper perforated panel of the final bed 2a is of an upwardly convex shape, i.e., is curved in both the direction A and the direction indicated by the arrow B (see FIG. 2) which is perpendicular to the direction A. The upper perforated panels of the other beds 2 are flat.

As shown in FIG. 1, the apparatus also has a quenching device 4 disposed outside of the heating furnace 1 in the vicinity of the outlet opening 1a. The quenching device 4 comprises a quenching bed 5 for receiving a sheet G of glass transferred from the final bed 2a and a cooling box 6 positioned above the quenching bed 5. The quenching bed 5 has a plurality of cooling air ejection holes 7 defined in an upper flat panel thereof. The cooling box 6 also has a plurality of cooling air ejection holes defined in a lower panel thereof. The quenching bed 5 is inclined downwardly away from the outlet opening 1a.

The upwardly convex upper panel of the final bed 2a has a radius R1 of curvature in the direction B, ranging from 1,000 mm to 4,000 mm, and a radius R2 of curvature in the direction A, ranging from 10,000 mm to 60,000 mm.

Figure 3:
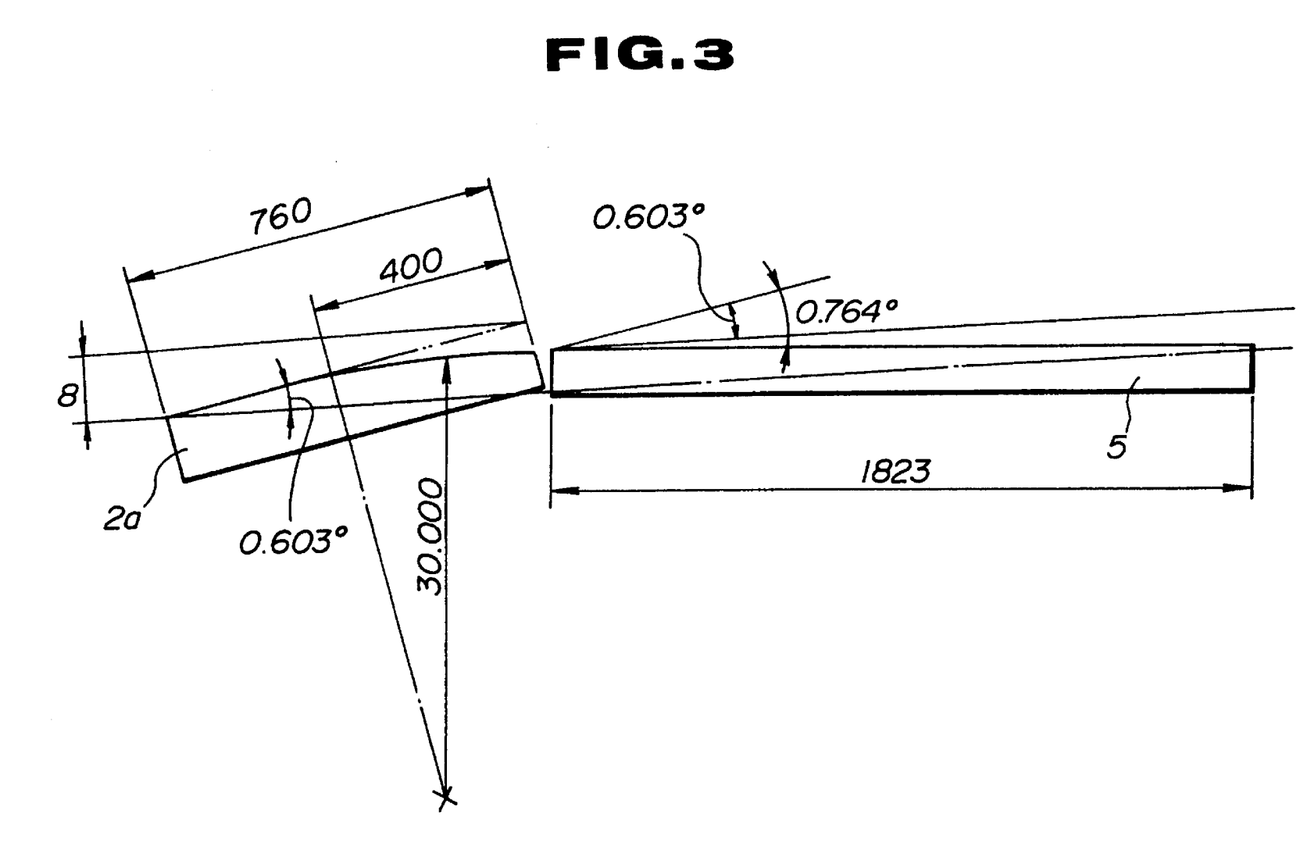
FIG. 3 is a side elevational view showing specific dimensions and angles of a final bed in a heating furnace and a quenching fed outside of the heating furnace.

FIG. 3 shows specific dimensions and angles of the final bed 2a and the quenching bed 5 in the case where the radius R2 of curvature is 30,000 mm. The final bed 2a has a length of 760 mm in the direction A and is inclined 0.603° upwardly from the horizontal plane such that the upper perforated panel thereof is progressively higher toward the outlet opening 1a. The upper perforated panel of the final bed 2a includes a portion curved in the direction A within a distance of 400 mm from the outlet opening 1a. The quenching bed 5 has a length of 1,823 mm in the direction A, and is inclined 0.764° downwardly from the horizontal plane such that the upper perforated panel thereof is progressively lower away from the outlet opening 1a. Therefore, the upper perforated panels of the final bed 2a and the quenching bed 5 are smoothly joined to each other with no abrupt intervening step therebetween.

In operation, a sheet G of glass introduced into the heating furnace 1 is conveyed through the heating furnace 1 toward the outlet opening 1a while being floated off the upper panels of the beds 2 by hot air ejected from the hot air ejection holes 3. The sheet G of glass may be conveyed by a running chain (not shown), for example, which extends along one side of the array of beds 2 and engages one side of the sheet G of glass. The sheet G of glass is heated while it is being conveyed and kept out of contact with the conveyor beds 2 in the heating furnace 1.

Figure 4:
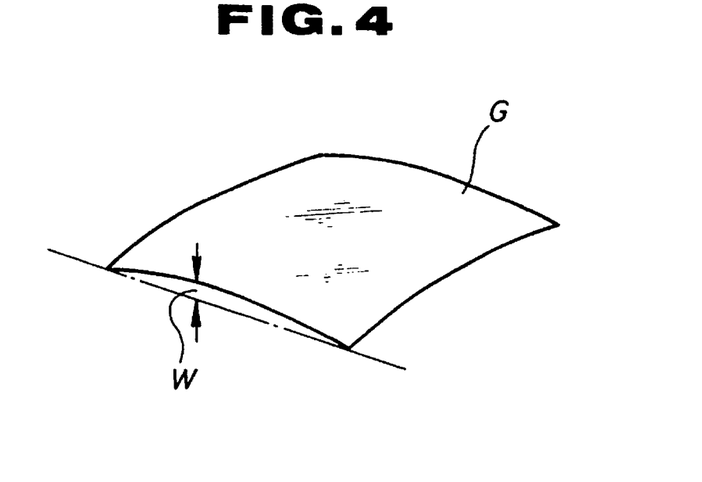
FIG. 4 is a perspective view of a formed sheet of glass.

When the sheet G of glass reaches the final bed 2a, the heated sheet G of glass starts being fed over the final bed 2a, and hence starts being shaped complementarily to the upwardly convex upper panel of the final bed 2a. Since the upper panel of the final bed 2a is curved in both the direction A and the direction B, the sheet G of glass is also curved, i.e., to be upwardly convex, in both the direction A and the direction B or three-dimensionally as shown in FIG. 4.

The curved sheet G of glass is then discharged out of the outlet opening 1a and transferred onto the quenching bed 5. When the curved sheet G of glass is received on the quenching bed 5, cooling air is ejected from the cooling air ejection holes in the quenching bed 5 and the cooling box 6 to cool the curved sheet G of glass.

The Table given below shows depths W of curvature of two sets of curved glass sheets whose respective radii R2 of curvature in the direction A are 10,000 mm, 30,000 mm, and 60,000 mm, respectively, the glass sheets having widths of 600 mm and 800 mm in the respective sets. The term "depth of curvature" used herein means the maximum distance between a line interconnecting spaced end points of a curved sheet glass and a convex bottom surface of the curved sheet glass in alignment with the line.

TABLE

| R2 | W (width: 800 mm) | W (width: 600 mm) |
|---|---|---|
| 10,000 mm | 8.0 mm | 4.5 mm |
| 30,000 mm | 2.6 mm | 1.5 mm |
| 60,000 mm | 1.3 mm | 0.8 mm |

With the apparatus according to the present invention, the sheet G of glass can be three-dimensionally curved without using molds while being continuously conveyed through and out of the heating furnace 1. Since the sheet G of glass can be simultaneously heated and curved, and then quenched in succession, the sheet G of glass can be three-dimensionally curved highly efficiently.

Figure 5:
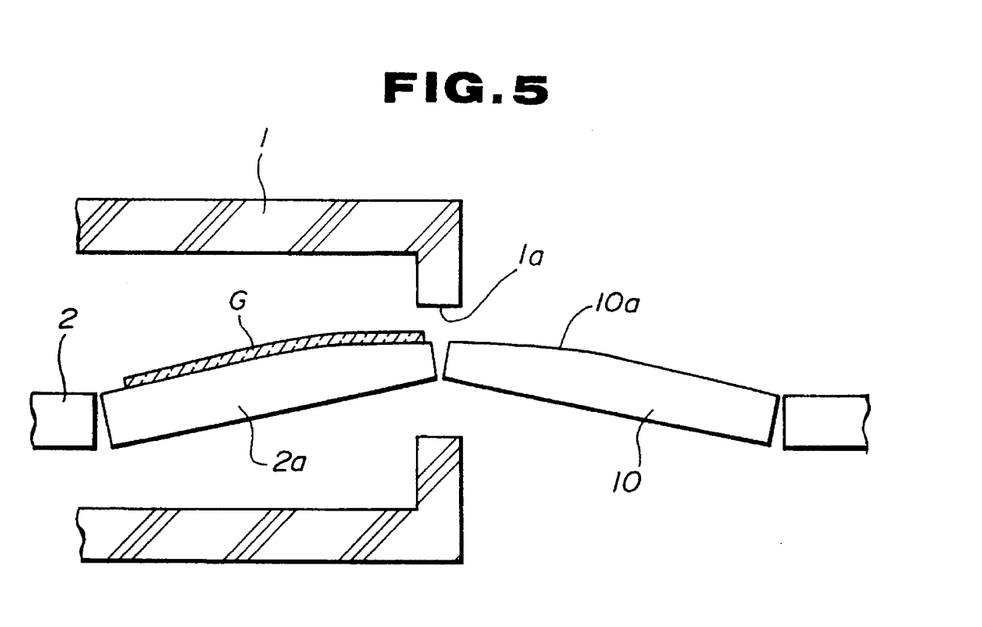
FIG. 5 is a longitudinal cross-sectional view of an apparatus for manufacturing a three-dimensionally curved sheet of glass according to another embodiment of the present invention.

FIG. 5 shows an apparatus for manufacturing a three-dimensionally curved sheet of glass according to another embodiment of the present invention.

In FIG. 5, the apparatus includes a quenching bed 10 having an upper perforated panel including an upwardly convex portion 10a near the outlet opening 1a for smooth connection to the final bed 2a. The other details of the apparatus shown in FIG. 5 are identical to those of the apparatus shown in FIG. 1.

Figure 6:
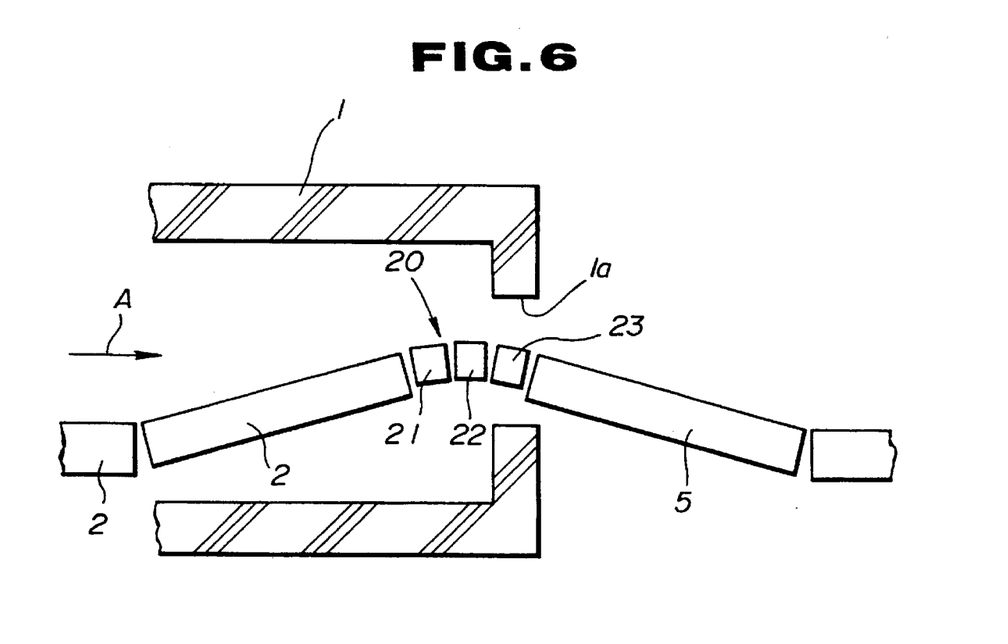
FIG. 6 is a longitudinal cross-sectional view of an apparatus for manufacturing a three-dimensionally curved sheet of glass according to still another embodiment of the present invention.

FIG. 6 shows an apparatus for manufacturing a three-dimensionally curved sheet of glass according to still another embodiment of the present invention.

The apparatus shown in FIG. 6 differs from the apparatus shown in FIG. 1 in that a final bed 20 is composed of small bed units 21, 22, 23 separated in the direction A, and the small bed units 21, 22, 23 are inclined such that their upper perforated panels jointly provide an upwardly convex surface extending in the direction A and disposed between the quenching bed 5 and an adjacent bed 2 which is inclined upwardly toward the outlet opening 1a. The small bed units 21, 22, 23 may not be inclined, and the upper perforated panels thereof may be upwardly convex.

Figure 7:
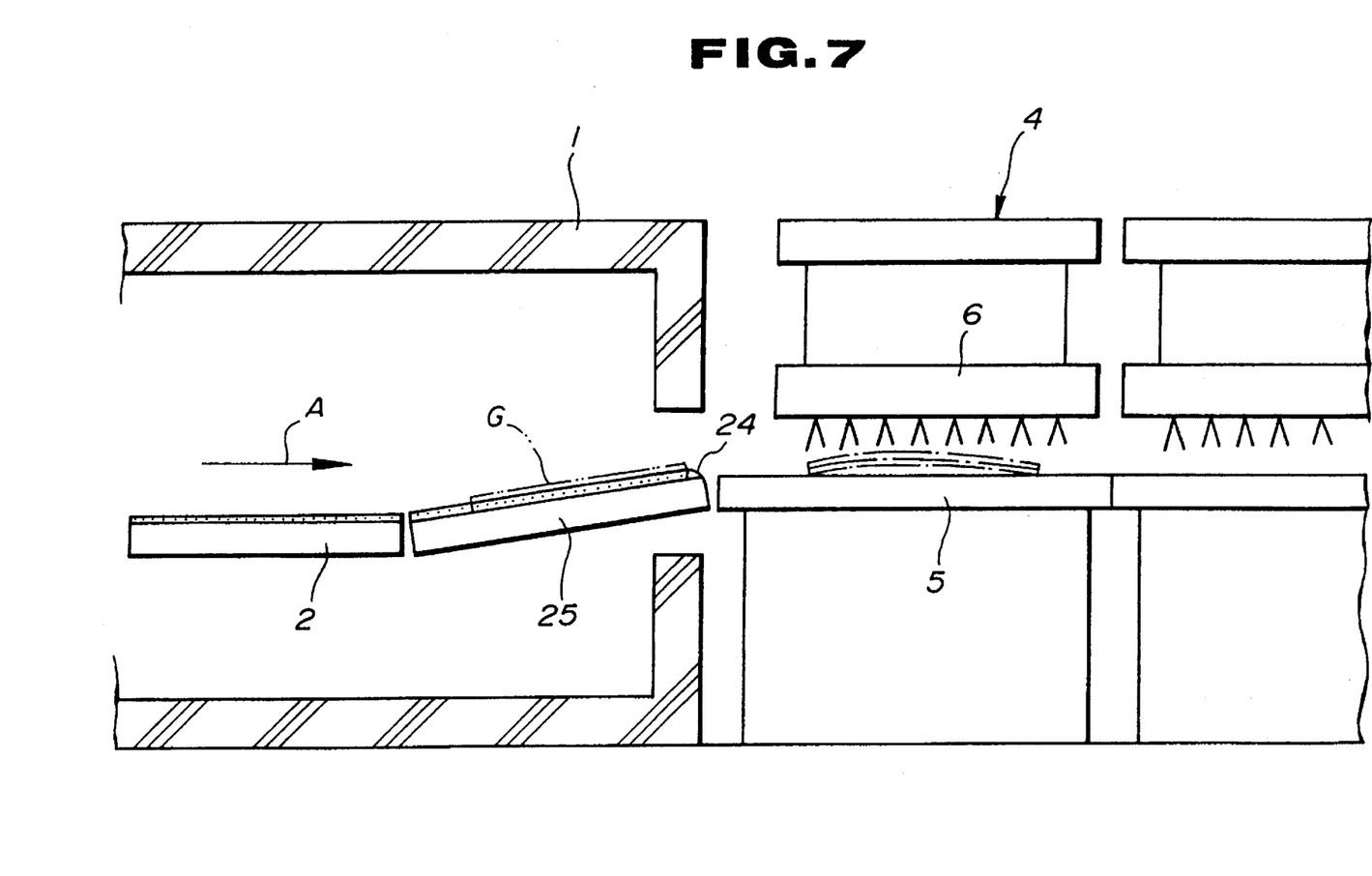
FIG. 7 is a longitudinal cross-sectional view of an apparatus for manufacturing a three-dimensionally curved sheet of glass according to a further embodiment of the present invention.
Figure 8:
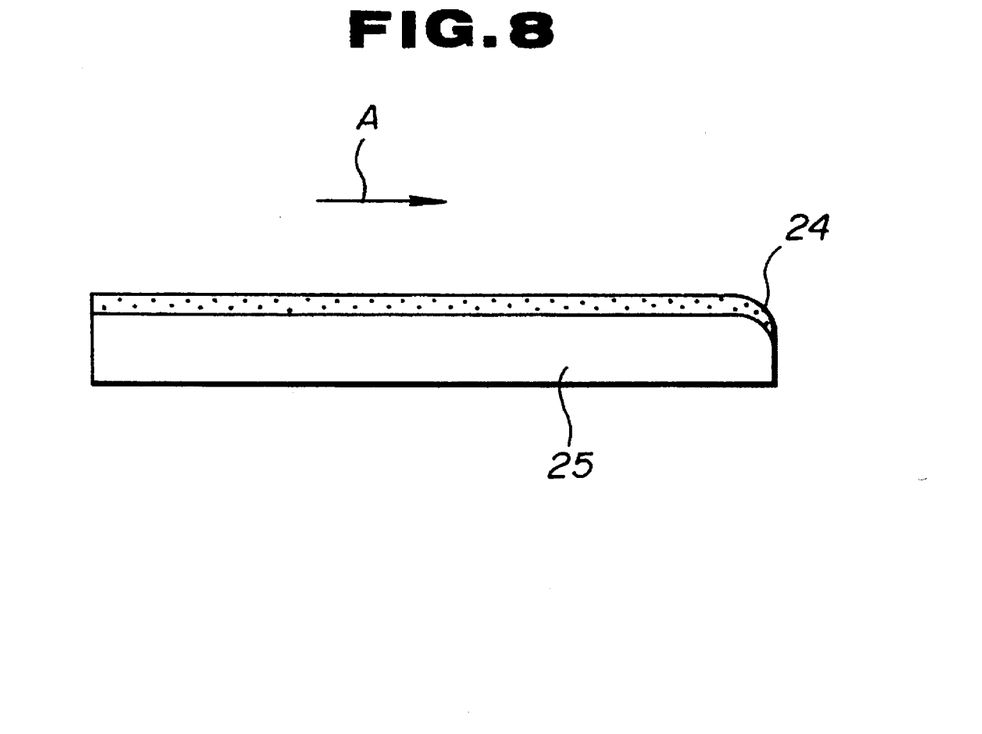
FIG. 8 is a side elevational view of a final bed of the apparatus shown in FIG. 7.
Figure 9:
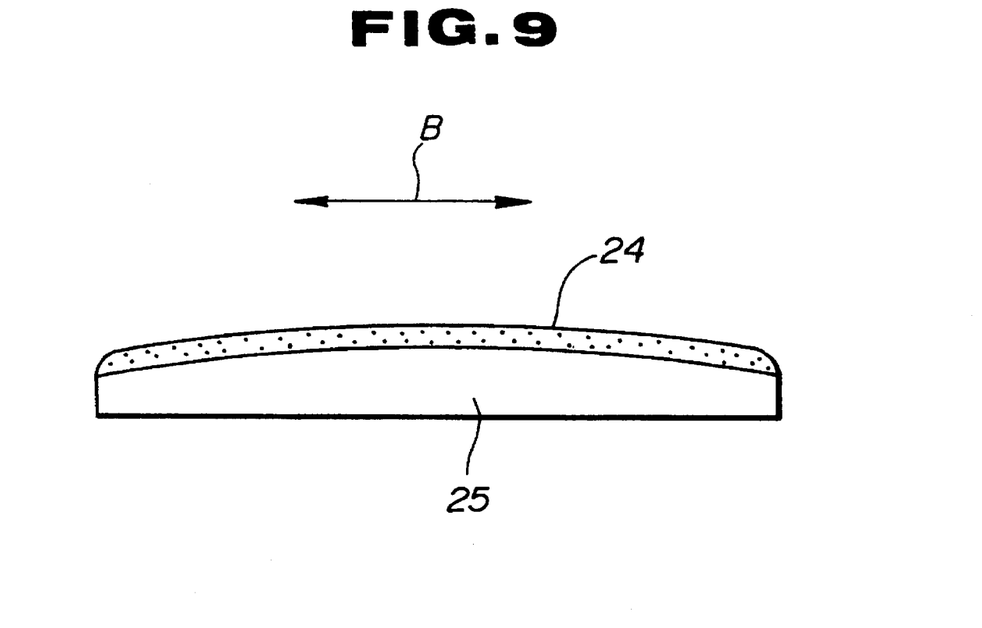
FIG. 9 is an end view of the final bed shown in FIG. 8 as viewed from a quenching device.

FIGS. 7 through 9 show an apparatus for manufacturing a three-dimensionally curved sheet of glass according to a further embodiment of the present invention.

The apparatus shown in FIG. 7 differs from the apparatus shown in FIG. 1 in that a final bed 25 has an upper perforated panel which is upwardly convex in the direction B (see FIG. 9) and straight in the direction A (see FIG. 8). The final bed 25 is inclined upwardly toward the outlet opening 1a, and the quenching bed 5 lies horizontally. A sheet G of glass is curved or upwardly convex in the direction B when it is conveyed over the final bed 21, and then curved or upwardly convex in the direction A when it is transferred from the final bed 25 onto the quenching bed 5. Therefore, the sheet G of glass is three-dimensionally curved when it is fed onto the quenching bed 5.

The quenching bed 5 may be inclined downwardly away from the outlet opening 1a. Stated otherwise, the final bed 2a should be inclined upwardly with respect to the quenching bed 5 which may be horizontal or inclined downwardly.

The final bed 25 has an upper beveled edge 24 on its downstream end for allowing the sheet G of glass to pass smoothly over the downstream end of the final bed 25. Even though the final bed 25 is not upwardly convex in the direction A and hence the sheet G of glass shaped by the final bed 25 is not upwardly convex and thus is straight in the direction A, the upper beveled edge 24 allows the lower surface of the sheet G of glass to travel clear of the downstream end of the final bed 25.

In the illustrated embodiments, the curved sheet G of glass is quenched by the quenching device 4 after it has been discharged from the heating furnace 1. However, the quenching device 4 may be dispensed with, or replaced with an ordinary bed.

Figure 10A:
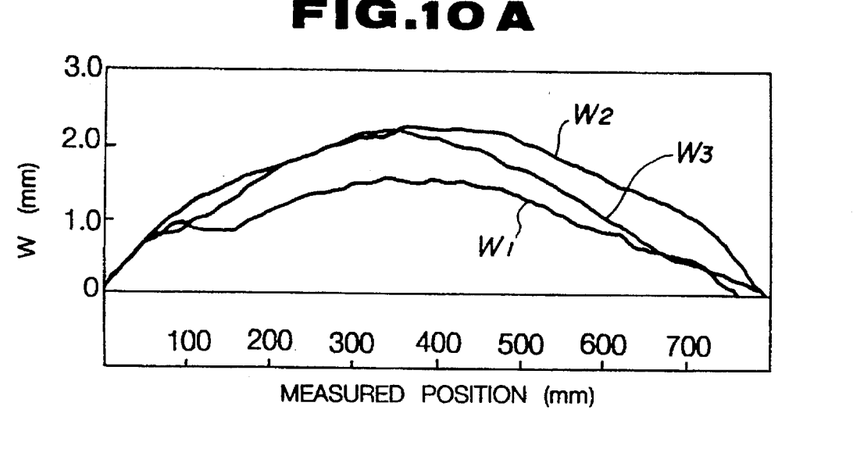
FIG. 10A is a graph showing depths of curvature at different positions of a sheet of glass curved by the apparatus according to the present invention.

FIG. 10A shows depths $W_1$, $W_2$, $W_3$ of curvature measured at different positions of a sheet G of glass curved by the apparatus according to the present invention. The glass G of sheet which was measured had a width of 500 mm, a length of 800 mm, and a thickness of 3.4 mm.

Figure 10B:
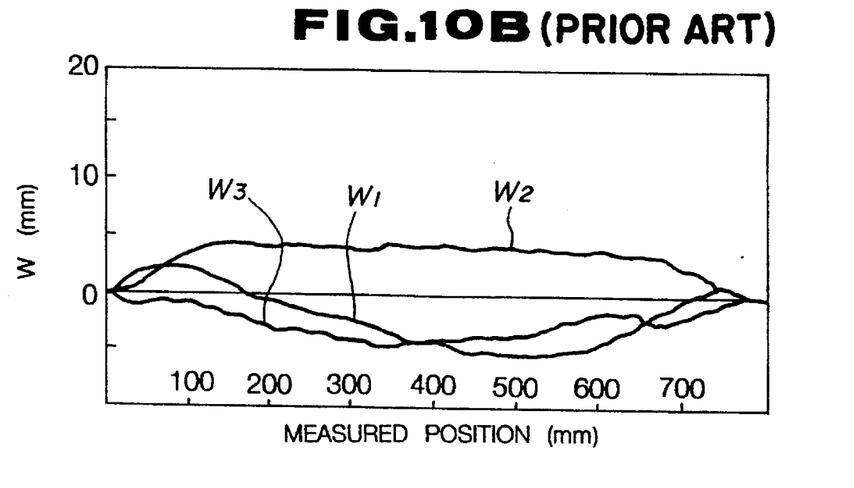
FIG. 10B is a graph showing depths of curvature at different positions of a sheet of glass curved by a conventional apparatus.

FIG. 10B shows depths $W_1$, $W_2$, $W_3$ of curvature measured at different positions of a sheet G of glass curved by a conventional apparatus. The sheet G of glass which was measured also had a width of 500 mm, a length of 800 mm, and a thickness of 3.4 mm.

Figure 10C:
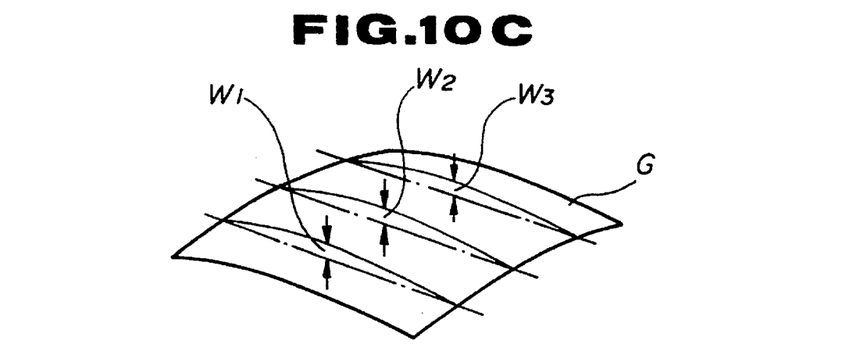
FIG. 10C is a schematic perspective view of a sheet of glass, showing different positions where the depths of curvature are measured.

The different positions where each sheet G of glass was measured for the depths $W_1$, $W_2$, $W_3$ of curvature are shown in FIG. 10C.

It can be seen from FIGS. 10A through 10C that a sheet G of glass can be curved much better by the apparatus according to the present invention than by the conventional apparatus.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An apparatus for manufacturing a curved sheet of glass, comprising:

a heating furnace for heating a sheet of glass therein, said heating furnace having an outlet opening for discharging a curved sheet of glass; and an array of beds housed in said furnace for transferring the sheet of glass successively over the beds in said furnace in a first direction toward said outlet opening while shaping the sheet of glass complementarily to an upper surface of said beds, each of said beds having a plurality of hot air ejection holes for ejecting hot air to keep the sheet of glass out of contact with said beds;

said beds including a final bed disposed near said outlet opening and inclined upwardly toward said outlet opening, said final bed having an upper panel including at least a portion curved in said first direction near said outlet opening to curve the sheet of glass in said first direction.

2. An apparatus according to claim 1, wherein said portion of the upper panel is upwardly convex in said first direction.

3. An apparatus according to claim 1, wherein said portion of the upper panel is upwardly convex in a second direction transverse to said first direction.

4. An apparatus according to claim 1, wherein said portion of the upper panel is upwardly convex in both said first direction and a second direction transverse to said first direction.

5. An apparatus according to claim 1, further comprising a quenching bed disposed outside of said heating furnace adjacent to said outlet opening, for receiving and quenching a sheet of glass discharged out of said outlet opening.

6. An apparatus according to claim 5, wherein said quenching bed is inclined downwardly away from said outlet opening.

7. An apparatus according to claim 5, wherein said quenching bed lies horizontally.

8. An apparatus according to claim 5, wherein said quenching bed has an upper panel including an upwardly convex portion near said outlet opening.

9. An apparatus for manufacturing a curved sheet of glass, comprising:

a heating furnace for heating a sheet of glass therein, said heating furnace having an outlet opening for discharging a sheet of curved glass; and an array of beds housed in said furnace for transferring the sheet of glass successively over the beds in said furnace in a first direction toward said outlet opening while shaping the sheet of glass complementarily to an upper surface of said beds, each of said beds having a plurality of hot air ejection holes for ejecting hot air to keep the sheet of glass out of contact with said beds;

said beds including a final bed disposed near said outlet opening and inclined upwardly toward said outlet opening, said final bed comprising a plurality of bed units separated in said first direction and inclined such that upper panels thereof jointly provide an upwardly convex surface extending in said first direction to curve the sheet of glass in said first direction.

10. An apparatus according to claim 9, wherein said array of beds includes a bed disposed adjacent to said final bed and inclined upwardly toward said final bed.

11. An apparatus according to claim 9, further comprising a quenching bed disposed outside of said heating furnace adjacent to said outlet opening, for receiving and quenching a sheet of glass discharged out of said outlet opening.

12. An apparatus according to claim 11, wherein said quenching bed is inclined downwardly away from said outlet opening.

13. An apparatus for manufacturing a curved sheet of glass, comprising:

a heating furnace for heating a sheet of glass therein, said heating furnace having an outlet opening for discharging a sheet of curved glass; and an array of beds housed in said furnace for transferring the sheet of glass successively over the beds in said furnace in a first direction toward said outlet opening while shaping the sheet of glass complementarily to an upper surface of said beds, each of said beds having a plurality of hot air ejection holes for ejecting hot air to keep the sheet of glass out of contact with said beds;

said beds including a final bed disposed near said outlet opening and inclined upwardly toward said outlet opening, said final bed having an upper panel which is upwardly convex in a second direction transverse to said first direction to curve the sheet of glass in said first direction and said second direction.

14. An apparatus according to claim 13, further comprising a quenching bed disposed outside of said heating furnace adjacent to said outlet opening, for receiving and quenching a sheet of glass discharged out of said outlet opening.

15. An apparatus according to claim 14, wherein said quenching bed lies horizontally.

16. An apparatus according to claim 13, wherein said final bed has an upper beveled edge on a downstream end thereof to keep said downstream end out of contact with the sheet of glass when the sheet of glass is discharged out of said outlet opening.

* * * * *